United States Patent
Kikuchi et al.

(12)

(10) Patent No.: US 6,259,839 B1
(45) Date of Patent: Jul. 10, 2001

(54) OPTICAL COMMUNICATION CONNECTOR

(75) Inventors: Kimihiro Kikuchi; Yoshihiro Someno, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/264,292

(22) Filed: Mar. 8, 1999

(30) Foreign Application Priority Data

Mar. 16, 1998 (JP) .................................................. 10-065265

(51) Int. Cl.[7] ...................................................... G02B 6/32
(52) U.S. Cl. ................ 385/33; 385/74; 385/38; 385/35
(58) Field of Search ................... 385/33, 35, 38, 385/74, 77, 61, 79, 71

(56) References Cited

U.S. PATENT DOCUMENTS 4,082,421  4/1978  Auracher et al. .
5,668,906  9/1997  Yamamura et al. .

FOREIGN PATENT DOCUMENTS 57-094708  12/1982  (JP) .
3-107112   5/1991   (JP) .
5-215938   8/1993   (JP) .

*Primary Examiner*—Frank G. Font
*Assistant Examiner*—Layla Lauchman
(74) *Attorney, Agent, or Firm*—Brinks Hofer Gilson & Lione

(57) ABSTRACT

Disclosed herein is an optical communication connector. A connector optically couples between a pair of plastic fibers and a pair of silica fibers, and a connector optically couples between the other ends of the silica fibers and a pair of plastic fibers. In such a construction, signal light is bidirectionally transmitted using these fibers. The connector is provided with one condenser lens within a casing. On the side of the transmission of signal light from the silica fiber to the plastic fiber, end surfaces of both cores P and Q are brought into intimate contact with each other. On the side of the transmission of signal light from the plastic fiber to the silica fiber, end surfaces of both cores P and Q are opposed to each other with the condenser lens interposed therebetween. The other connector is also constructed in a manner similar to the above connector.

1 Claim, 1 Drawing Sheet

OPTICAL COMMUNICATION CONNECTOR

BACKGROUND OF THE INVENTION

1. Field of the Invention

The present invention relates to an optical communication connector suitable for use in an optical communication device for bidirectionally transmitting a signal between a plurality of devices such as personal computers, AV devices, etc. by means of optical fibers as in the case where, for example, an in-house network is constructed.

2. Description of the Related Art

As optical fibers employed in an optical communication device, there are known one (hereinafter called "silica fiber") having a core whose material is $Sio_2$ and one (hereinafter called "plastic fiber") having a core whose material is plastic. The former silica fiber has the advantage of less transfer losses as compared with the plastic fiber. On the other hand, since the core is small in diameter, a high-accuracy optical-axis alignment is required when silica fibers are optically-coupled to each other, whereby an optical connector becomes so expensive. In contrast to this, the latter plastic fiber has an advantage in that as compared with the silica fiber, an inexpensive optical connector (e.g., plastic molded product) can be used because it is large in core diameter but on the other hand, it has a drawback in that transfer losses are greatly produced and a transfer distance is about several tens of meters at the very outside.

Owing to such reasons, a communication system in which a transfer distance is relatively short as in the in-house network and many connectors are required, uses plastic fibers heavily. However, when light is transmitted over a distance exceeding a transferable distance of one plastic fiber, the light emitted from an end surface of one plastic fiber is photoelectrically transferred into an electric signal by a light-receiving device. Further, the resultant electric signal is amplified and converted to a light signal again by a light-emitting device, after which it is launched into an end surface of the other plastic fiber, whereby relays are made between a plurality of plastic fibers.

However, such a conventional optical communication device has a problem in that when the light signal is transmitted over the distance exceeding the transferable distance of one plastic fiber, the light signal is photoelectrically converted into the electric signal and the resultant electric signal is amplified and converted to the light signal again, so that the light-receiving device, amplifier and light-emitting device are required every transferable distances of respective one plastic fibers, thus increasing the entire communication system in cost and complexity.

SUMMARY OF THE INVENTION

The present invention adopts a communication system in which a transmission range is divided every areas not exceeding a transferable distance of each plastic fiber, a signal is bidirectionally transmitted over the respective areas through the plastic fibers and relays are made between the plastic fibers in the respective areas via silica fibers and provides an optical communication connector suitable for use in such a communication system and provided between the plastic fibers and the silica fibers, which is constructed such that signal light delivered from the plastic fiber is launched into the silica fiber through a condenser lens and the signal light from the silica fiber is directly launched into the plastic fiber. According to such a construction, the bidirectional optical communications with a distant place can be performed by the plastic fibers without using signal amplifying means. Further, since the optical communication connector, which optically couples between the plastic fibers and the silica fibers, can be simplified in structure, the cost of the entire communication system can be reduced and the system can be simplified.

The optical communication connector of the present invention is constructed in such a manner that, within a common casing, light emitted and diffused from an end surface of a core of a first plastic fiber is focused on a condenser lens to thereby launch it into an end surface of a core of a first silica fiber, and end surfaces of respective cores of a second silica fiber and a second plastic fiber are kept in intimate contact with each other to thereby directly launch signal light from the second silica fiber to the second plastic fiber.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DESCRIPTION OF THE PREFERRED EMBODIMENT

Figure 1:
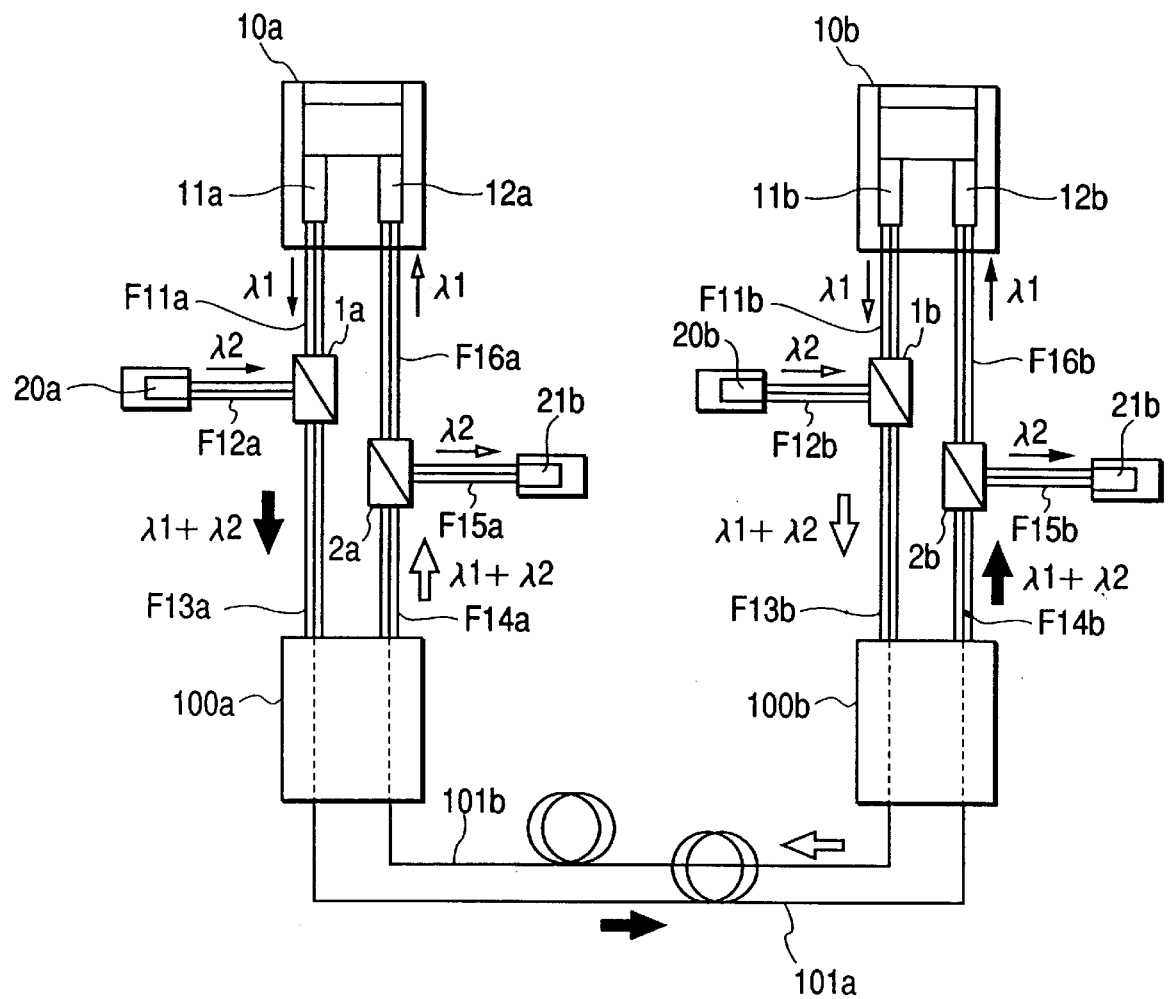
FIG. 1 is a diagram showing a configuration of an optical communication system to which an optical communication connector according to an embodiment of the present invention is applied.
Figure 2:
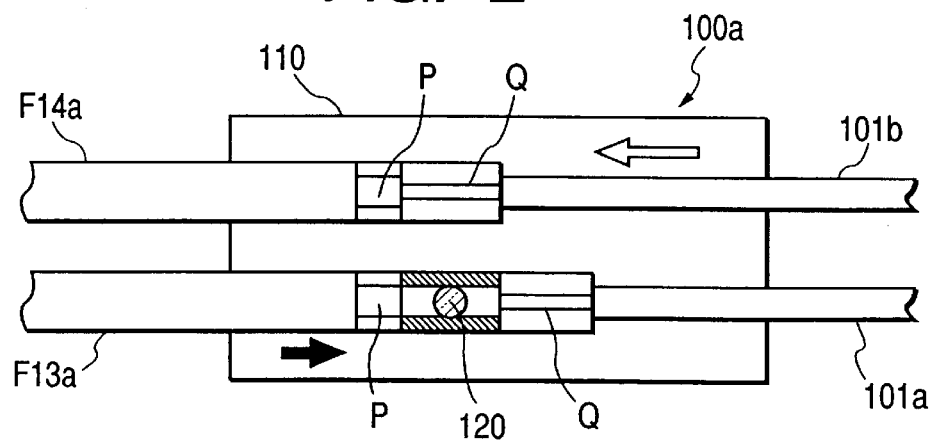
FIG. 2 is a diagram showing a structure of the optical communication connector shown in FIG. 1.

A preferred embodiment of the present invention will hereinafter be described with reference to the accompanying drawings. FIG. 1 is a diagram showing a configuration of an optical communication system, and FIG. 2 is a diagram illustrating a structure of an optical communication connector employed in the optical communication system.

The optical communication system shown in FIG. 1 is shown as an illustrative example, which performs bidirectional optical communications between transmit-receive optical modules 10a and 10b at a wavelength $\lambda$ 1=660 nm, transmits a light signal having $\lambda$ 2 =850 nm from an LED (light-emitting device) 20a to a photodiode (light-receiving device) 21b and transmits the light signal having $\lambda$ 2=850 nm from an LED 20b to a photodiode 21a. One transmit-receive optical module 10a has an LED 11a for emitting light having $\lambda$ 1=660 nm and a photodiode 12a for receiving the light having $\lambda$ 1=660 nm. Similarly, the other transmit-receive optical module 10b has an LED 11b for emitting the light having $\lambda$ 1=660 nm and a photodiode 12b for receiving the light having $\lambda$ l=660 nm.

The LEDs 11a and 11b of the transmit-receive optical modules 10a and 10b are respectively optically-coupled to one ends of plastic fibers F11a and F11b. The other ends of the plastic fibers F11a and F11b are respectively optically-coupled to wave-merging filters 1a and 1b. The light-merging filters 1a and 1b respectively allow $\lambda$ 1=660 nm inputted through the plastic fibers F11a and F11b to pass therethrough and respectively reflect $\lambda$ 2=850 nm inputted from the LEDs 20a and 20b through plastic fibers F12a and F12b to thereby combine or merge these two wavelengths into one, thus emitting the same to one ends of plastic fibers F13a and F13b.

The other ends of the plastic fibers F13a and F13b are respectively optically-coupled to optical communication connectors 100a and 100b to be described later. These connectors 100a and 100b are connected to each other through two silica fibers 101a and 101b for bidirectional transmission, so that a multiplexed wavelength of λ 1=660 nm and λ 2=850 nm is transmitted to the opposite party through the silica fibers 101a and 101b. Further, one ends of plastic fibers F14a and F14b are respectively optically-coupled to the connectors 100a and 100b. The other ends of the plastic fibers F14a and F14b are respectively optically-coupled to the wave-merging filters 2a and 2b.

The wave-merging filters 2a and 2b are constructed so as to allow λ 1=660 nm inputted through the plastic fibers F14a and F14b to pass therethrough and reflect λ 2=850 nm. λ 1=660 nm transmitted through the wave-merging filters 2a and 2b are respectively outputted to the photodiodes 12a and 12b of the transmit-receive optical modules 10a and 10b through plastic fibers F16a and F16b. λ 2=850 nm reflected from the wave-merging filters 2a and 2b are respectively outputted to photodiodes 21a and 21b through plastic fibers F15a and F15b.

As shown in FIG. 2, one connector 100a is constructed in such a manner that within a casing 110, an end surface of a core P of the plastic fiber F14a is brought into intimate contact with an end surface of a core Q of the silica fiber 101b and an end surface of a core P of the plastic fiber F13a is opposed to an end surface of a core Q of the silica fiber 101a with a condenser lens 120 interposed therebetween. Here, the cores P of the plastic fibers F13a and F14a are relatively large in diameter (approximately 980 μm) and the cores Q of the silica fibers 101a and 101b are significantly small in diameter (approximately 50 μm) as described above. Therefore, even if the end surfaces of both cores P and Q are kept in intimate contact with each other so as to directly launch signal light delivered from the silica fiber 101b into the plastic fiber F14a on the side of the transmission of the signal light from the silica fiber 101b small in core diameter to the plastic fiber F14a large in core diameter, a transmission-failure problem does not occur. On the side of the transmission of signal light from the plastic fiber F13a large in core diameter to the silica fiber 101a small in core diameter in contrast to the above, the signal light emitted and diffused from the end surface of the core P of the plastic fiber F13a is focused on the condenser lens 120 so that the light is launched into the end surface of the core Q of the silica fiber 101a. Therefore, the signal light delivered from the plastic fiber F13a is reliably transmitted to the silica fiber 101a.

Although not illustrated in the drawing, the other connector 100b is also constructed in a manner similar to the connector 100a. That is, on the side of the transmission of signal light from the silica fiber 101a small in core diameter to the plastic fiber F14b large in core diameter, the end surfaces of both cores P and Q are kept in intimate contact with each other. On the side of the transmission of signal light from the plastic fiber F13b large in core diameter to the silica fiber 101b small in core diameter, the end surfaces of both cores P and Q are opposed to each other with a condenser lens interposed therebetween. They are set within a common casing.

In the aforementioned embodiment, the plastic fibers F11a through 16a and the plastic fibers F11b through 16b are respectively laid on different floors of an intelligent building, for example, and the silica fibers 101a and 101b provides relays between the plastic fibers 13a and 14a on one floor and the plastic fibers F13b and 14b on the other floor, whereby bidirectional optical communications with a distant place can be performed without using signal amplifying means (light-receiving device, amplifier and light-emitting device). Further, the plastic fibers F13a and 14a and the silica fibers 101a and 101b can be optically-coupled to each other by one connector 100a. Similarly, the plastic fibers F13b and 14b and the silica fibers 101a and 101b can be also optically-coupled to each other by one connector 100b. Further, since the condenser lens 120 may be provided between the end surfaces of the respective cores on the side of the transmission of signal light from the plastic fiber to the silica fiber, these connectors 100a and 100b can be simplified in structure, thereby making it possible to reduce the cost of the entire communication system and simplify the system.

The present invention has been described by the embodiment described above and can exhibit effects described as follows.

A transmission range is divided every areas not exceeding a transferable distance of each plastic fiber. A signal is bidirectionally transmitted over the respective areas through the plastic fibers. Further, relays are made between the plastic fibers in the respective areas via silica fibers. Therefore, the bidirectional optical communications with a distant place can be performed without using signal amplifying means. Further, since an optical communication connector lying between the plastic fibers and the silica fibers is constructed such that signal light delivered from the plastic fiber is launched into the silica fiber through a condenser lens and the signal light from the silica fiber is directly launched into the plastic fiber, the connector can be simplified in structure and the cost of the entire communication system can be reduced and the system can be simplified.

While the present invention has been described with reference to the illustrative embodiment, this description is not intended to be construed in a limiting sense. Various modifications of the illustrative embodiment will be apparent to those skilled in the art on reference to this description. It is therefore contemplated that the appended claims will cover any such modifications or embodiments as fall within the true scope of the invention.

What is claimed is:

1. An optical communication connector, comprising, within a common casing:

a first plastic fiber;

a first silica fiber;

a condenser lens for focusing light emitted and diffused from an end surface of a core of said first plastic fiber thereon so as to be launched into an end surface of a core of said first silica fiber;

a second silica fiber; and a second plastic fiber, wherein end surfaces of respective cores of said second silica fiber and said second plastic fiber are brought into intimate contact with each other so that signal light transmitted from said second silica fiber is directly launched into said second plastic fiber.

* * * * *